US012575610B2

(12) United States Patent
Lord

(10) Patent No.: US 12,575,610 B2
(45) Date of Patent: Mar. 17, 2026

(54) ELECTRONIC VAPOR PROVISION DEVICE

(71) Applicant: NICOVENTURES TRADING LIMITED, London (GB)

(72) Inventor: Christopher Lord, London (GB)

(73) Assignee: Nicoventures Trading Limited, London (GB)

( * ) Notice: Subject to any disclaimer, the term of this patent is extended or adjusted under 35 U.S.C. 154(b) by 0 days.

(21) Appl. No.: 19/239,799

(22) Filed: Jun. 16, 2025

(65) Prior Publication Data

US 2025/0302107 A1 Oct. 2, 2025

Related U.S. Application Data

(63) Continuation of application No. 17/329,639, filed on May 25, 2021, which is a continuation of application No. 14/415,524, filed as application No. PCT/EP2013/064922 on Jul. 15, 2013, now Pat. No. 11,039,643.

(30) Foreign Application Priority Data

Jul. 16, 2012 (GB) ..................................... 1212599

(51) Int. Cl.

| | |
|---|---|
| ***A24F 40/46*** | (2020.01) |
| ***A24F 40/00*** | (2020.01) |
| ***H05B 3/16*** | (2006.01) |
| *A24F 40/10* | (2020.01) |

(52) U.S. Cl.
CPC .............. *A24F 40/46* (2020.01); *A24F 40/00* (2020.01); *H05B 3/16* (2013.01); *A24F 40/10* (2020.01); *H05B 2203/021* (2013.01)

(58) Field of Classification Search
None
See application file for complete search history.

(56) References Cited

U.S. PATENT DOCUMENTS

| | | | | |
|---|---|---|---|---|
| 11,039,643 B2 | 6/2021 | Lord | | |
| 2011/0209717 A1* | 9/2011 | Han | .................... | H01M 10/488 131/273 |
| 2021/0274845 A1 | 9/2021 | Lord | | |

FOREIGN PATENT DOCUMENTS

| | | |
|---|---|---|
| WO | WO/2014/012894 | 1/2014 |

* cited by examiner

*Primary Examiner* — Dionne W. Mayes
(74) *Attorney, Agent, or Firm* — Womble Bond Dickinson (US) LLP

(57) ABSTRACT

An electronic vapor provision device comprising a power cell and a vaporizer, wherein the vaporizer comprises a heater and a heater support, wherein one or more gaps are provided between the heater and the heater support.

29 Claims, 9 Drawing Sheets

ELECTRONIC VAPOR PROVISION DEVICE

CLAIM FOR PRIORITY

This application is a continuation of U.S. application Ser. No. 17/329,639, filed May 25, 2021, which is continuation of U.S. application Ser. No. 14/415,524 filed Jan. 16, 2015, which in turn is a National Stage of International Application No. PCT/EP2013/064922, filed Jul. 15, 2013, which in turn claims priority to and benefit of United Kingdom Patent Application No. GB1212599.3, filed Jul. 16, 2012. The entire contents of the aforementioned applications are expressly incorporated herein by reference.

TECHNICAL FIELD

The specification relates to electronic vapour provision devices.

BACKGROUND

Electronic vapour provision devices, such as electronic cigarettes, are typically cigarette-sized and typically function by allowing a user to inhale a nicotine vapour from a liquid store by applying a suction force to a mouthpiece. Some electronic vapour provision devices have an airflow sensor that activates when a user applies the suction force and causes a heater coil to heat up and vaporize the liquid.

SUMMARY

In an embodiment there is provided an electronic vapour provision device comprising a power cell and a vaporizer, where the vaporizer comprises a heating element and a heating element support, wherein a gap is provided between the heating element and the heating element support. The heating element may be on the outside of the heating element support. Moreover, the heating element support can have a support outer surface and the gap may be provided between the heating element and the support outer surface. Furthermore, the heating element and heating element support may form a heating rod.

In another embodiment there is provided a vaporizer for use in the vapour provision device that comprises a heating element and a heating element support, wherein a gap is provided between the heating element and the heating element support.

In another embodiment there is provided an electronic vapour provision device comprising a liquid store; a wicking element configured to wick liquid from the liquid store to a heating element for vaporizing liquid; an air outlet for vaporized liquid produced by the heating element; and a heating element support, wherein a gap is provided between the heating element and the heating element support.

The electronic vapour provision device may include a power cell for powering the heating element.

BRIEF DESCRIPTION OF THE DRAWINGS

For a better understanding of the disclosure, and to show how example embodiments may be carried into effect, reference will now be made to the accompanying drawings in which.

DETAILED DESCRIPTION

Figure 1:
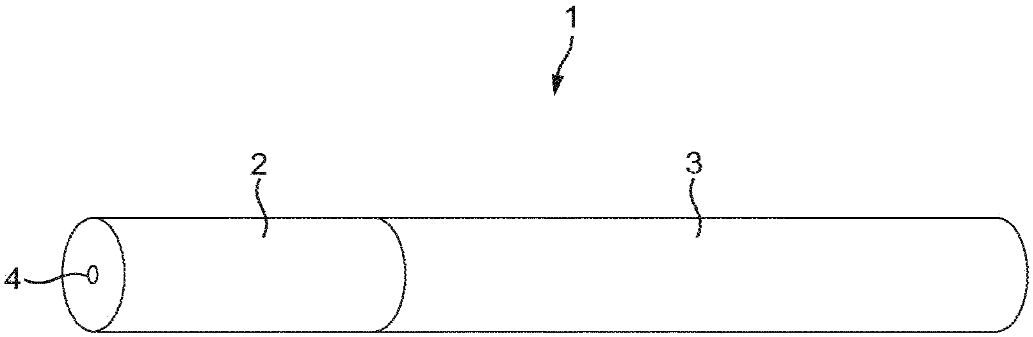
FIG. 1 is a side perspective view of an electronic cigarette.

In an embodiment there is provided an electronic vapour provision device comprising a power cell and a vaporizer, where the vaporizer comprises a heating element and a heating element support, wherein a gap is provided between the heating element and the heating element support.

Having a separate heating element and support allows a finer heating element to be constructed. This is advantageous because a finer heating element can be more efficiently heated. Providing a gap between the heating element and the heating element support allows liquid to be gathered and stored in the gap region for vaporization. The gap can also act to wick liquid onto the heating element. Also, providing a gap between the heating element and support means that a greater surface area of the heating element is exposed thereby giving a greater surface area for heating and vaporization.

The heating element may be on the outside of the heating element support. Moreover, the heating element support can comprise a support outer surface and the gap may be provided between the heating element and the support outer surface.

The heating element and heating element support may form a heating rod. The heating element support may for example be a rigid support and/or the heating element support may be solid. This has the advantage that a rigid or solid support enables a more fragile, more efficient heating element to be used. The combination of the support and the heating element provides a more robust heating rod.

The heating element support may be porous. For example, the heating element support may comprise a porous ceramic material. Having a porous support enables liquid to be stored in the porous support. Thus the liquid can be easily transferred to the heating element in contact with the support for vaporization by the heating element. Also, the gap between the heating element and the support allows for wicking of liquid both from the porous support onto the heating element and into the porous support for storage.

The heating element can be formed around the heating element support. For example, the heating element may be a heating coil. Moreover, the heating coil may be coiled around the heating element support. The heating coil may for instance be a wire coil. The gap may be between a coil turn and the heating element support. Gaps may be between coil turns and the heating element support.

Having a heating element that wraps around the support provides a more sturdy construction. The support also facilitates the creation of a coil by enabling wire to be wrapped around the support. By providing a gap between a coil turn and the support, liquid can be wicked into the gap and held in the gap for vaporization. In particular, liquid can be wicked by the spaces between coil turns and into the gap between a coil turn and the support.

The vaporizer can further comprise a vaporization cavity configured such that in use the vaporization cavity is a negative pressure region. At least part of the heating element may be inside the vaporization cavity. Furthermore, the electronic vapour provision device can comprise a mouthpiece section and the vaporizer can be part of the mouthpiece section.

By having the heating element in the vaporization cavity, which in turn is a negative pressure region when a user inhales through the electronic vapour provision device, the liquid is directly vaporized and inhaled by the user.

The heating element support may be elongated in a lengthwise direction. Furthermore, the heating element support may have a side channel running lengthwise along the support. Alternatively or additionally, the heating element support may comprise two or more side channels running lengthwise along the support. Moreover, the side channels may be distributed substantially evenly around the heating element support.

A channel in the support provides a natural gap between the support and the heating element. This is particularly the case when the heating element is a coil wound around the support. The channel therefore provides the necessary gap to wick and store liquid. The area of the heating element exposed is also increased along the channel leading to increased vaporization in this region.

The heating element support may be non-cylindrical. The heating element support may be cylinder-like but non-cylindrical. The heating element support may have a non-circular cross-section. Moreover, the heating element support may have a pitted surface.

Since a coil is naturally cylindrical when formed due to the rigidity of the wire, a non-cylindrical support has the advantage that there will naturally be gaps between the coil and the support. These gaps lead to increased wicking, liquid storage and vaporization. A cylinder-like support with a pitted surface provides gaps between the support and the coil in the pit regions. Cross-sections are sections perpendicular to the elongated lengthwise direction.

The cross-sectional shape of the heating element support can be a polygon. For example, the cross-sectional shape of the heating element support may have 3 sides, 4 sides, 5 sides, 6 sides or 8 sides.

Alternatively, the cross-sectional shape of the heating element support can be a flat rectangle. Alternatively, the cross-sectional shape of the heating element support can be an ellipse. Alternatively, the cross-sectional shape of the heating element support can be equivalent to three overlapping circles joined together.

Alternatively, the cross-sectional shape of the heating element support can be a cross. The cross-sectional shape of the heating element support may be a cross having 4 arms, or a cross having 8 arms.

Again, these various shapes of support provide natural gaps between the support and a heating element coil that is wound around the support. These gaps lead to increased wicking, liquid storage and vaporization.

Alternatively, the heating element support may be a flat planar substrate. Moreover, the heating element can be on one surface of the heating element support. Furthermore, the heating element may be threaded in and out of the heating element support. The heating element may be wrapped around the heating element support. Moreover, the heating element support may comprise a substrate having holes.

In another embodiment there is provided an electronic vapour provision device comprising a liquid store; a wicking element configured to wick liquid from the liquid store to a heating element for vaporizing liquid; an air outlet for vaporized liquid to pass out of; and a heating element support, wherein a gap is provided between the heating element and the heating element support. The electronic vapour provision device may comprise a power cell for powering the heating element.

Referring to FIG. 1 there is shown an embodiment of the electronic vapour provision device 1 in the form of an electronic cigarette 1 comprising a mouthpiece 2 and a body 3. The electronic cigarette 1 is shaped like a conventional cigarette having a cylindrical shape. The mouthpiece 2 has an air outlet 4 and the electronic cigarette 1 is operated when a user places the mouthpiece 2 of the electronic cigarette 1 in their mouth and inhales, drawing air through the air outlet 4. Both the mouthpiece 2 and body 3 are cylindrical and are configured to connect to each other coaxially so as to form the conventional cigarette shape.

Figure 2:
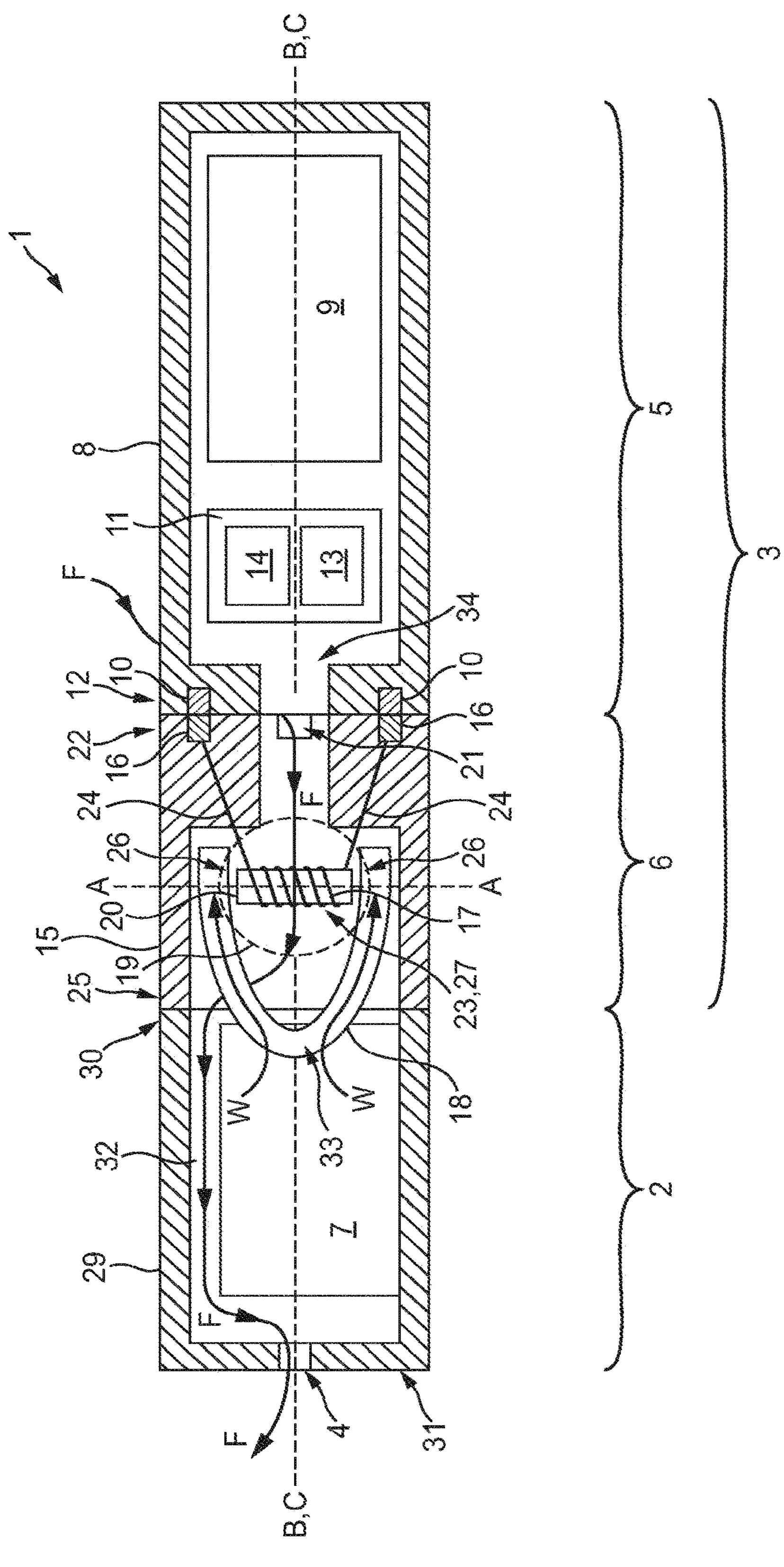
FIG. 2 is a schematic sectional view of an electronic cigarette having a perpendicular coil.

FIG. 2 shows an example of the electronic cigarette 1 of FIG. 1. The body 3 comprises two detachable parts, comprising a battery assembly 5 part and a vaporizer 6 part, and the mouthpiece 2 comprises a liquid store 7. The electronic cigarette 1 is shown in its assembled state, wherein the detachable parts 2, 5, 6 are connected in the following order: mouthpiece 2, vaporizer 6, battery assembly 5. Liquid wicks from the liquid store 7 to the vaporizer 6. The battery assembly 5 provides electrical power to the vaporizer 6 via mutual electrical contacts of the battery assembly 5 and the vaporizer 6. The vaporizer 6 vaporizes the wicked liquid and the vapour passes out of the air outlet 4. The liquid may for example comprise a nicotine solution.

The battery assembly 5 comprises a battery assembly casing 8, a power cell 9, electrical contacts 10 and a control circuit 11.

The battery assembly casing 8 comprises a hollow cylinder which is open at a first end 12. For example, the battery assembly casing 8 may be plastic. The electrical contacts 10 are located at the first end 12 of the casing 8, and the power cell 9 and control circuit 11 are located within the hollow of the casing 8. The power cell 9 may for example be a Lithium Cell.

The control circuit 11 includes an air pressure sensor 13 and a controller 14 and is powered by the power cell 9. The controller 14 is configured to interface with the air pressure sensor 13 and to control provision of electrical power from the power cell 9 to the vaporizer 6.

The vaporizer 6 comprises a vaporizer casing 15, electrical contacts 16, a heating element 17, a wicking element 18, a vaporization cavity 19 and a heating element support 20.

The vaporizer casing 15 comprises a hollow cylinder which is open at both ends with an air inlet 21. For example, the vaporizer casing 15 may be formed of an aluminum alloy. The air inlet 21 comprises a hole in the vaporizer casing 15 at a first end 22 of the vaporizer casing 15. The electrical contacts 16 are located at the first end 22 of the vaporizer casing 15.

The first end 22 of the vaporizer casing 15 is releasably connected to the first end 12 of the battery assembly casing 8, such that the electrical contacts 16 of the vaporizer are electrically connected to the electrical contacts 10 of the battery assembly. For example, the device 1 may be configured such that the vaporizer casing 15 connects to the battery assembly casing 8 by a threaded connection.

Figure 4:
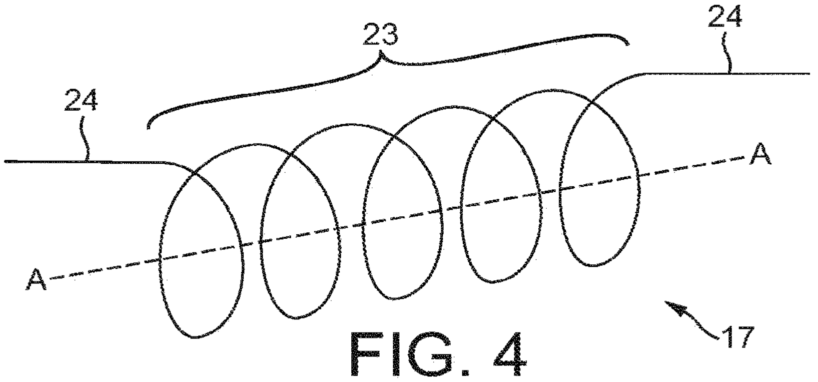
FIG. 4 is a side perspective view of a heating element coil.
Figure 6:
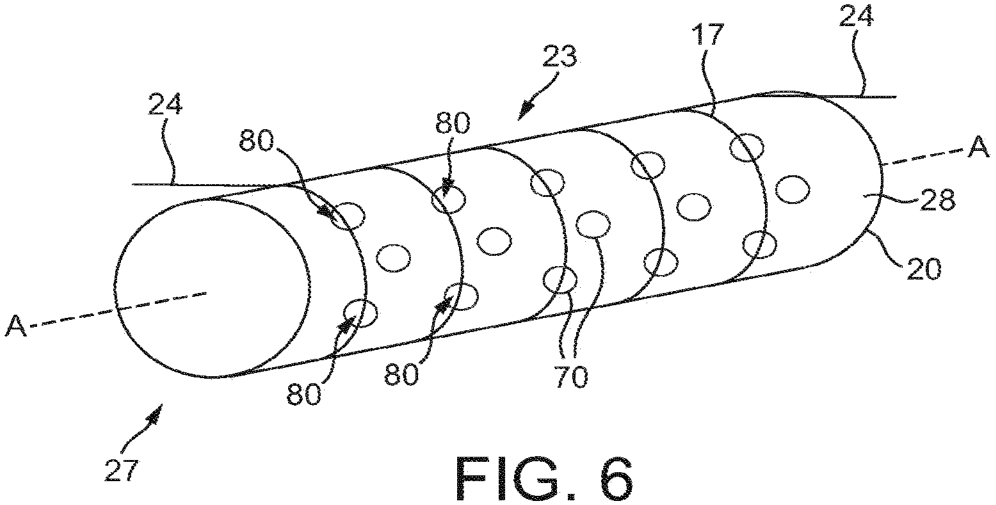
FIG. 6 is a side perspective view of a heating element coil and heating element support having a pitted surface.

The heating element 17 is formed of a single wire and comprises a heating element coil 23 and two leads 24, as is illustrated in FIGS. 4 and 6. For example, the heating element may be formed of Nichrome. The coil 23 comprises a section of the wire where the wire is formed into a helix about an axis A. At either end of the coil 23, the wire departs from its helical form to provide the leads 24. The leads 24 are connected to the electrical contacts 16 and are thereby configured to route electrical power, provided by the power cell 9, to the coil 23.

The wire of the coil 23 is approximately 0.12 mm in diameter. The coil 23 is approximately 25 mm in length, has an internal diameter of approximately 1 mm and a helix pitch of approximately 420 micrometers. The void between the successive turns of the coil is therefore approximately 300 micrometers.

The heating element 17 is located towards the second end 25 of the vaporizer casing 15 and is orientated such that the axis A of the coil 23 is perpendicular to the cylindrical axis B of the vaporizer casing 15. The heating element 17 is thus perpendicular to the longitudinal axis C of the electronic cigarette 1. Moreover, the device 1 is configured such that the axis A of the coil is substantially perpendicular to airflow through the device when a user sucks on the device. Use of the device 1 by a user is later described in more detail.

The wicking element 18 extends from the vaporizer casing 15 into contact with the liquid store 7 of the mouthpiece 2. The wicking element 18 is configured to wick liquid in the direction W from the liquid store 7 of the mouthpiece 2 to the heating element 17. In more detail, the wick 18 comprises an arc of porous material extending from a first end of the coil 23, out past the second end 25 of the vaporizer casing 15 and back to a second end of the coil. For example, the porous material may be nickel foam, wherein the porosity of the foam is such that the described wicking occurs.

The vaporization cavity 19 comprises a region within the hollow of the vaporizer casing 15 in which liquid is vaporized. The heating element 17, heating element support 20 and portions 26 of the wicking element 18 are situated within the vaporization cavity 19.

Figure 5:
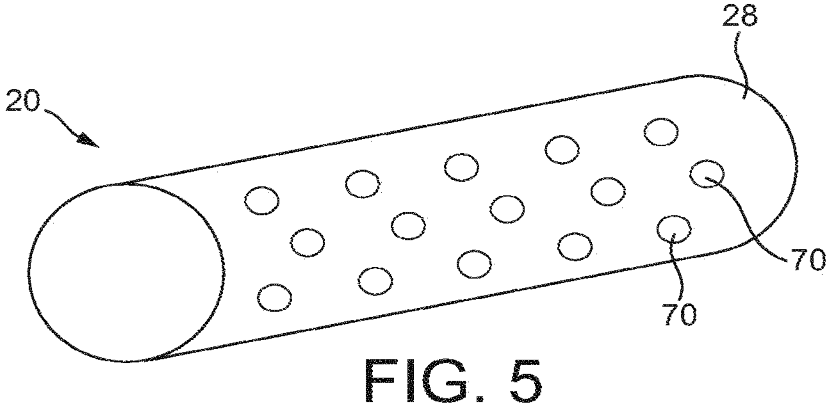
FIG. 5 is a side perspective view of a cylindrical heating element support having a pitted surface.

The heating element support 20 is configured to support the heating element 17 and to facilitate vaporization of liquid by the heating element 17. The heating element support 20 is an inner support and is illustrated in FIGS. 5 and 6. The support 20 comprises a rigid cylinder of ceramic material. The support 20 is situated coaxially within the helix of the heating element coil 23 and is slightly longer than the coil 23, such that the ends of the support 20 protrude from the ends of the coil 23. The diameter of the cylindrical support 20 is similar to the inner diameter of the helix. As a result, the wire of the coil 23 is substantially in contact with the support 20 and is thereby supported, facilitating maintenance of the shape of the coil 23. The heating element coil 23 is thus coiled, or wrapped, around the heating element support 20. The combination of the support 20 and the coil 23 of the heating element 17 provides a heating rod 27, as illustrated in FIGS. 5 and 6. The heating rod is later described in more detail with reference to FIGS. 5 and 6.

The surface 28 of the support 20 provides a route for liquid from the wick element 18 to wick onto and along, improving the provision of liquid to the vicinity of the heating element 17 for vaporization. The surface 28 of the support 20 also provides surface area for exposing wicked liquid to the heat of the heating element 17.

The mouthpiece 2 comprises a mouthpiece casing 29. The mouthpiece casing 29 comprises a hollow cylinder which is open at a first end 30, with the air outlet 4 comprising a hole in the second end 31 of the casing. For example, the mouthpiece casing may be formed of plastic.

The liquid store 7 is situated within the hollow of the mouthpiece casing 29. For example, the liquid store may comprise foam, wherein the foam is substantially saturated in the liquid intended for vaporization. The cross-sectional area of the liquid store 7 is less than that of the hollow of the mouthpiece casing so as to form an air passageway 32 between the first end 30 of the mouthpiece casing 29 and the air outlet 4.

The first end 30 of the mouthpiece casing 29 is releasably connected to the second end 25 of the vaporizer casing 15, such that the liquid store 7 is in contact with a portion 33 of the wicking element 18 which protrudes from the vaporizer 6.

Liquid from the liquid store 7 is absorbed by the wicking element 18 and wicks along route W throughout the wicking element 18. Liquid then wicks from the wicking element 18 onto and along the coil 23 of the heating element 17, and onto and along the support 20.

There exists a continuous inner cavity 34 within the electronic cigarette 1 formed by the adjacent hollow interiors' of the mouthpiece casing 29, the vaporizer casing 15 and the battery assembly casing 8.

In use, a user sucks on the second end 31 of the mouthpiece 2. This causes a drop in the air pressure throughout the inner cavity 34 of the electronic cigarette 1, particularly at the air outlet 4.

The pressure drop within the inner cavity 34 is detected by the pressure sensor 13. In response to detection of the pressure drop by the pressure sensor, the controller 14 triggers the provision of power from the power cell 9 to the heating element 17 via the electrical contacts 10, 16. The coil of the heating element 17 therefore heats up. Once the coil 17 heats up, liquid in the vaporization cavity 19 is vaporized. In more detail, liquid on the heating element 17 is vaporized, liquid on the heating element support 20 is vaporized and liquid in portions 26 of the wicking element

18 which are in the immediate vicinity of the heating element 17 may be vaporized.

The pressure drop within the inner cavity 34 also causes air from outside of the electronic cigarette 1 to be drawn, along route F, through the inner cavity from the air inlet 21 to the air outlet 4. As air is drawn along route F, it passes through the vaporization cavity 19 and the air passageway 32. The vaporized liquid is therefore conveyed by the air movement along the air passageway 32 and out of the air outlet 4 to be inhaled by the user.

As the air containing the vaporized liquid is conveyed to the air outlet 4, some of the vapour may condense, producing a fine suspension of liquid droplets in the airflow. Moreover, movement of air through the vaporizer 6 as the user sucks on the mouthpiece 2 can lift fine droplets of liquid off of the wicking element 18, the heating element 17 and/or the heating element support 20. The air passing out of the outlet may therefore comprise an aerosol of fine liquid droplets as well as vaporized liquid.

The pressure drop within the vaporization cavity 19 also encourages further wicking of liquid from the liquid store 7, along the wicking element 18, to the vaporization cavity 19.

Figure 3:
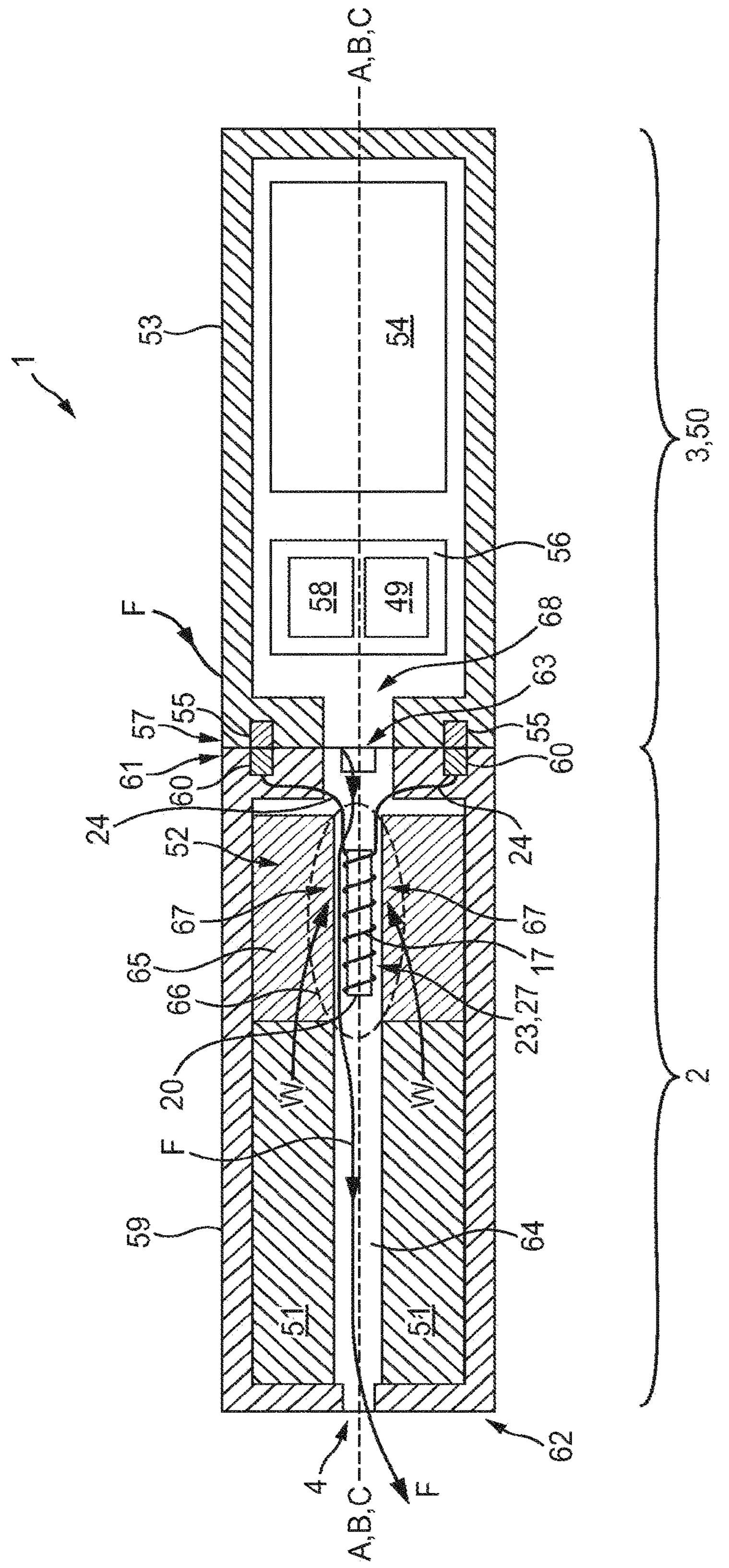
FIG. 3 is a schematic sectional view of an electronic cigarette having a parallel coil.

FIG. 3 shows a further example of the electronic cigarette 1 of FIG. 1. The body 3 is a single part, referred to herein as a battery assembly 50, and the mouthpiece 2 comprises a liquid store 51 and a vaporizer 52. The electronic cigarette 1 is shown in its assembled state, wherein the detachable parts 2, 50 are connected. Liquid wicks from the liquid store 51 to the vaporizer 52. The battery assembly 50 provides electrical power to the vaporizer 52 via mutual electrical contacts of the battery assembly 50 and the mouthpiece 2. The vaporizer 52 vaporizes the wicked liquid and the vapour passes out of the air outlet 4. The liquid may for example comprise a nicotine solution.

The battery assembly 50 comprises a battery assembly casing 53, a power cell 54, electrical contacts 55 and a control circuit 56.

The battery assembly casing 53 comprises a hollow cylinder which is open at a first end 57. For example, the battery assembly casing may be plastic. The electrical contacts 55 are located at the first end 57 of the casing 53, and the power cell 54 and control circuit 56 are located within the hollow of the casing 53. The power cell 54 may for example be a Lithium Cell.

The control circuit 56 includes an air pressure sensor 58 and a controller 49 and is powered by the power cell 54. The controller 49 is configured to interface with the air pressure sensor 58 and to control provision of electrical power from the power cell 54 to the vaporizer 52, via the electrical contacts 55.

The mouthpiece 2 further comprises a mouthpiece casing 59 and electrical contacts 60. The mouthpiece casing 59 comprises a hollow cylinder which is open at a first end 61, with the air outlet 4 comprising a hole in the second end 62 of the casing 59. The mouthpiece casing 59 also comprises an air inlet 63, comprising a hole near the first end 61 of the casing 59. For example, the mouthpiece casing may be formed of aluminum.

The electrical contacts 60 are located at the first end of the casing 59. Moreover, the first end 61 of the mouthpiece casing 59 is releasably connected to the first end 57 of the battery assembly casing 53, such that the electrical contacts 60 of the mouthpiece are electrically connected to the electrical contacts 55 of the battery assembly. For example, the device 1 may be configured such that the mouthpiece casing 59 connects to the battery assembly casing 53 by a threaded connection.

The liquid store 51 is situated within the hollow mouthpiece casing 59 towards the second end 62 of the casing 59. The liquid store 51 comprises a cylindrical tube of porous material saturated in liquid. The outer circumference of the liquid store 51 matches the inner circumference of the mouthpiece casing 59. The hollow of the liquid store 51 provides an air passageway 64. For example, the porous material of the liquid store 51 may comprise foam, wherein the foam is substantially saturated in the liquid intended for vaporization.

The vaporizer 52 comprises a heating element 17, a wicking element 65, a heating element support 20 and a vaporization cavity 66.

The wicking element 65 comprises a cylindrical tube of porous material and is situated within the mouthpiece casing 59, towards the first end 61 of the casing 59, such that it abuts the liquid store 51. The outer circumference of the wicking element 65 matches the inner circumference of the mouthpiece casing 59. The wicking element 65 is configured to wick liquid in the direction W from the liquid store 51 of the mouthpiece 2 to the heating element 17. For example, the porous material of the wicking element 65 may be nickel foam, wherein the porosity of the foam is such that the described wicking occurs. Once liquid wicks W from the liquid store 6 to the wicking element 65, it can be stored in the porous material of the wicking element 65.

Thus, the wicking element 65 is an extension of the liquid store 51.

The heating element 17 is formed of a single wire and comprises a heating element coil 23 and two leads 24, as is illustrated in FIGS. 4 and 6. For example, the heating element may be formed of Nichrome. The coil 23 comprises a section of the wire where the wire is formed into a helix about an axis A. At either end of the coil 23, the wire departs from its helical form to provide the leads 24. The leads 24 are connected to the electrical contacts 60 and are thereby configured to route electrical power, provided by the power cell 54, to the coil 23.

The wire of the coil 23 is approximately 0.12 mm in diameter. The coil 23 is approximately 25 mm in length, has an internal diameter of approximately 1 mm and a helix pitch of approximately 420 micrometers. The void between the successive turns of the coil is therefore approximately 300 micrometers The heating element 17 is located inside the tube of the wicking element 65 and is orientated such that the axis of the coil 23 is aligned with the cylindrical axis B of the mouthpiece casing 59. The axis A of the heating element coil 23 is thus parallel to the longitudinal axis C of the electronic cigarette 1. Moreover, the device 1 is configured such that the axis A of the coil 23 is substantially parallel to airflow F through the device when a user sucks on the device. Use of the device 1 by a user is later described in more detail.

Figure 3A:
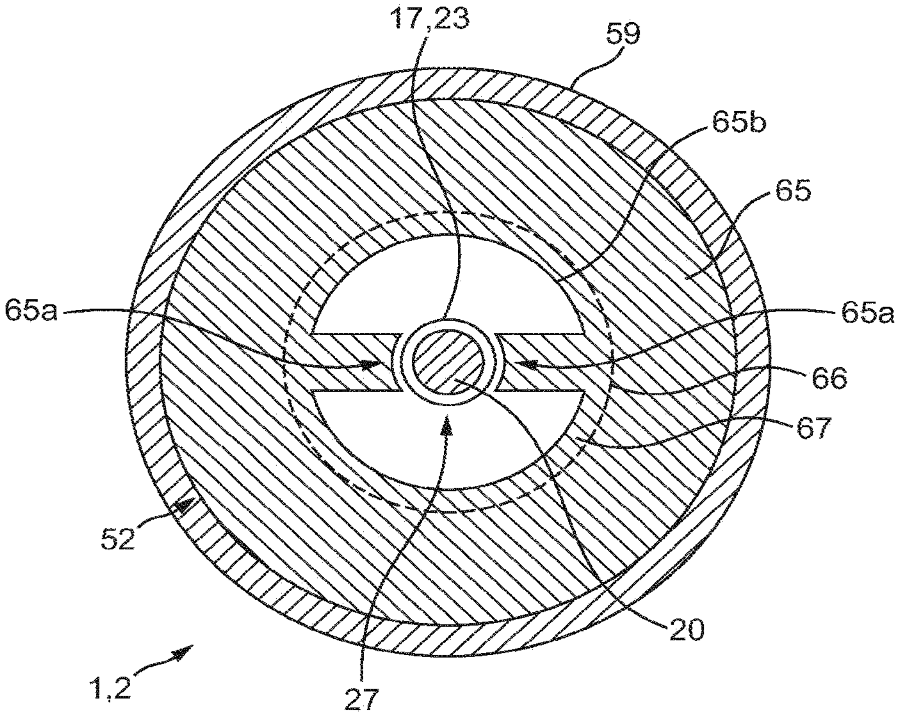
FIG. 3A is a cross-sectional view through a mouthpiece of an electronic cigarette.

FIG. 3*a* shows a cross-section through the mouthpiece 2 at the coil 23. As is illustrated in FIG. 3*a*, the cross-sectional profile of the wicking element 65 is configured such that parts 65*a* of the inner surface 65*b* of the wicking element 65 are in contact with the coil 23. This provides a route for liquid to wick from the wicking element 65 to the coil 23.

The vaporization cavity 66 comprises a region within the hollow of the mouthpiece casing 59 in which liquid is vaporized. The heating element 17, heating element support 20 and a portion 67 of the wicking element 65 are situated within the vaporization cavity 66.

The heating element support 20 is configured to support the heating element 17 and to facilitate vaporization of liquid by the heating element 17. The heating element support is an inner support and is illustrated in FIGS. 5 and 6. The support 20 comprises a rigid cylinder of ceramic material. The support 20 is situated coaxially within the helix of the heating element coil 23 and is slightly longer than the coil 23, such that the ends of the support 20 protrude from the ends of the coil 23. The diameter of the cylindrical support 20 is similar to the inner diameter of the helix. As a result, the wire of the coil 23 is substantially in contact with the support 20 and is thereby supported, facilitating maintenance of the shape of the coil 23. The heating element coil 23 is thus coiled, or wrapped, around the heating element support 20. The combination of the support 20 and the coil 23 of the heating element 17 provides a heating rod 27, as illustrated in FIGS. 5 and 6. The heating rod 27 is later described in more detail with reference to FIGS. 5 and 6.

The surface 28 of the support 20 provides a surface for liquid from the wicking element 65 to wick onto and along, improving the provision of liquid to the vicinity of the heating element 17 for vaporization. The surface 28 of the support 20 also provides surface area for exposing wicked liquid to the heat of the heating element 17.

There exists a continuous inner cavity 68 within the electronic cigarette 1 formed by the adjacent hollow interiors' of the mouthpiece casing 59 and the battery assembly casing 53. In use, a user sucks on the second end 62 of the mouthpiece casing 59. This causes a drop in the air pressure throughout the inner cavity 68 of the electronic cigarette 1, particularly at the air outlet 4.

The pressure drop within the inner cavity 68 is detected by the pressure sensor 58. In response to detection of the pressure drop by the pressure sensor 58, the controller 49 triggers the provision of power from the power cell 54 to the heating element 17 via the electrical contacts 55, 60. The coil of the heating element 17 therefore heats up. Once the coil 17 heats up, liquid in the vaporization cavity 66 is vaporized. In more detail, liquid on the heating element 17 is vaporized, liquid on the heating element support 20 is vaporized and liquid in the portions 67 of the wicking element 65 which are in the immediate vicinity of the heating element 17 may be vaporized.

The pressure drop within the inner cavity 68 also causes air from outside of the electronic cigarette 1 to be drawn, along route F, through the inner cavity from the air inlet 63 to the air outlet 4. As air is drawn along route F, it passes through the vaporization cavity 66, picking up vaporized liquid, and the air passageway 64. The vaporized liquid is therefore conveyed along the air passageway 64 and out of the air outlet 4 to be inhaled by the user.

As the air containing the vaporized liquid is conveyed to the air outlet 4, some of the vapour may condense, producing a fine suspension of liquid droplets in the airflow. Moreover, movement of air through the vaporizer 52 as the user sucks on the mouthpiece 2 can lift fine droplets of liquid off of the wicking element 65, the heating element 17 and/or the heating element support 20. The air passing out of the air outlet may therefore comprise an aerosol of fine liquid droplets as well as vaporized liquid.

With reference to FIGS. 5 and 6, the circumferential outer surface 28 of the heating element support 20 is pitted, such that a plurality of depressions 70, or recesses, exists in the surface 28. When considering the presence of the plurality of depressions 70, the support 20 is substantially cylindrical.

Gaps 80 are formed between the heating element support 20 and the coil 23 where the coil 23 overlaps depressions 70 in the surface 28. In more detail, where the wire of the coil 23 passes over a depression 70 in the surface 28, a gap 80 is provided between the wire and the area of the surface 28 immediately under the wire due to the wire substantially maintaining its helical form. The gaps 80 are therefore disposed in a radial direction from the axis A of the coil, between the surface 28 of the support 20 and the wire of the coil 23. The distance between the wire and the surface 28 at each gap 80 is in the range of 10 micrometers to 500 micrometers. The gaps 80 are configured to facilitate the wicking of liquid onto and along the length of the support 20 through capillary action at the gaps 80.

The depressions 70 in the circumferential surface 28 and/or the gaps 80 provide areas in which liquid can gather on the surface 28 of the support 20 prior to vaporization, and thereby provide areas for liquid to be stored prior to vaporization. The depressions 70 also increase the surface area of the support 20, thus increasing the additional surface area for exposing liquid to the coil 23 for vaporization provided by the support 20. The depressions 70 also expose more of the coil 23 for increased vaporization in these areas.

Many alternatives and variations to the embodiments described above are possible. For example, FIGS. 7 to 24 show different configurations of heating element 17 and heating element support 20. In each case, a gap 80 or gaps 80 are provided between the outer surface 28 of the support 20 and the wire of the coil 23. These gaps 80 provide the advantages already described. FIGS. 7 to 22 illustrate how gaps 80 can be provided by one or more inward deviations 81 in the cross-sectional profile of a support 20, where that profile otherwise follows the cross-sectional inner profile of a coil 23.

Figure 7:
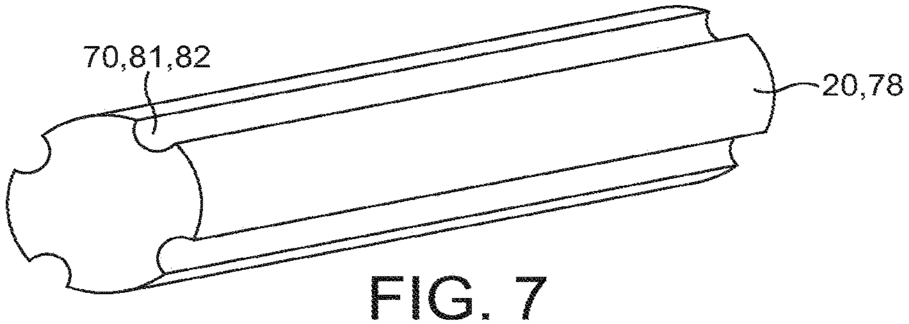
FIG. 7 is a side perspective view of a heating element support having channels.
Figure 8:
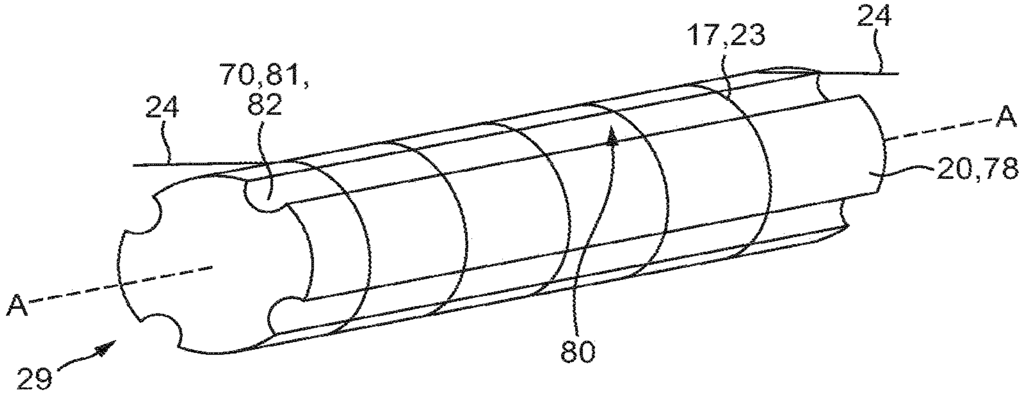
FIG. 8 is a side perspective view of a heating element coil and heating element support having channels.
Figure 9:
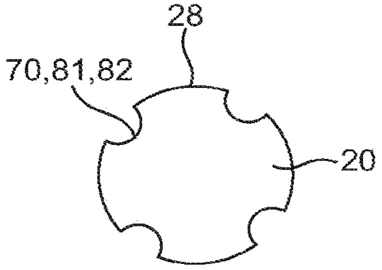
FIG. 9 is an end view of the heating element support of FIG. 7.
Figure 10:
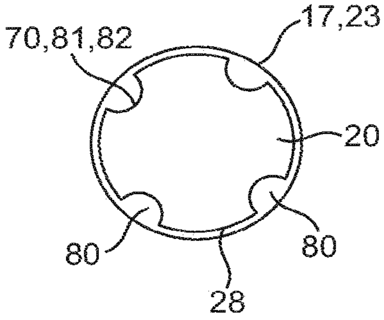
FIG. 10 is an end view of the heating element coil and support of FIG. 8.
Figure 11:
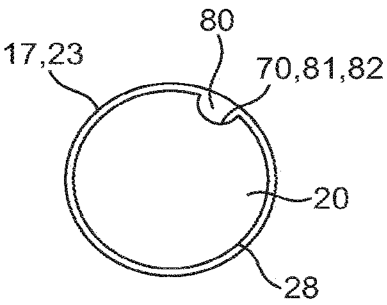
FIG. 11 is an end view of a coil and a heating element support having a channel.

FIGS. 7 to 10 show a different example of a heating element support 20. FIGS. 7 and 9 illustrate different views of the heating element support 20 alone. FIGS. 8 and 10 illustrate different views of the heating rod 29, comprising the coil 23 wrapped around the support 20. Here, the heating element support 20 is substantially cylindrical in shape and has channels 82, or longitudinal grooves 82, in the outer surface 28 of the support 20 running along its length. Each channel 82 is a depression 70, 81 in the surface of the heating element support 20 running along the length of the support 20. Four channels 82 are spaced evenly around the circumference of the heating element support 20.

As shown in FIG. 8 and FIG. 10, when the coil 23 is wound around the heating element support 20, gaps 80 are provided between the surface 28 of the support 20 at the channels 82 and the wire of the coil 23 sections overlapping the channels 82.

FIGS. 11 to 22 each show an example of an elongated heating element support 20 with a coil 23 wound around it and a gap 80 or gaps 80 provided between the coil 23 and the heating element support 20 by virtue of the cross-sectional shape of the support 20. Each example has a different cross-sectional shape as will be described. Cross-sections are sections perpendicular to the elongated lengthwise direction of the support 20.

In the example shown in Figure ii, the heating element support 20 is substantially cylindrical with a depression 70 comprising a single channel 82 running along its length. Thus the cross-sectional shape of the heating element support 20 is a circle with a small indent 81 for the channel 82. Gaps 80 are provided where the coil 23 overlaps the channel 82.

Figure 12:
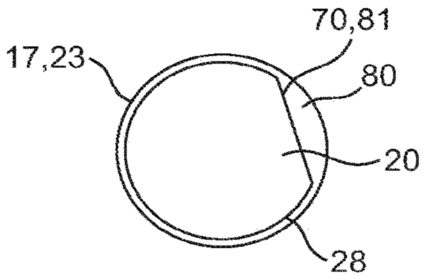
FIG. 12 is an end view of a coil and a heating element support having a circular segment cross-section.

In the example shown in FIG. 12, the heating element support 20 has a cross-sectional shape being a major segment of a circle. This corresponds to an otherwise cylindrical shape with a longitudinal depression 70, 81, and results in a flat face running along the length of the heating element support 20. The coil 23 is wound around the heating element support 20 but the rigidity of the coil 23 wire prevents the coil 23 from following the shape of the heating element support 20 in the flat region. Thus a gap 80 is provided between the heating element support 20 and the coil 23 in the area of the flat region.

Figure 13:
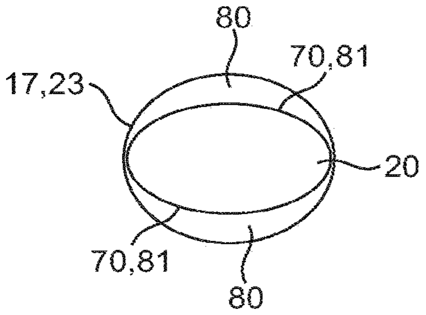
FIG. 13 is an end view of a coil and a heating element support having an oval cross-section.

In the example shown in FIG. 13, the heating element support 20 has a cross-sectional shape being an ellipse. The coil 23 is wound around the heating element support 20 but the rigidity of the coil 23 wire causes the coil 23 to form a more rounded shape than the ellipse, thereby providing gaps 80 between the heating element support 20 and the coil 23.

Figure 14:
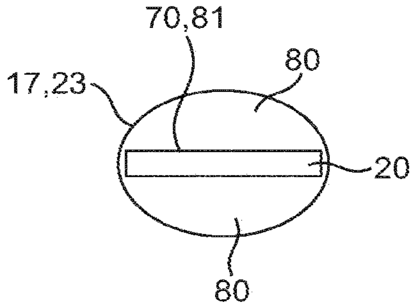
FIG. 14 is an end view of a coil and a heating element support having a flat rectangular cross-section.
Figure 15:
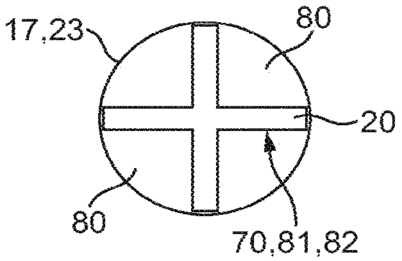
FIG. 15 is an end view of a coil and a heating element support having a 4 arm cross, cross-section.

In the example shown in FIG. 14, the heating element support 20 is a flat bar having a cross-sectional shape being a flat rectangle. The coil 23 is wound around the heating element support 20 but the rigidity of the coil 23 wire causes the coil 23 to form a more rounded shape than the rectangle, thereby providing gaps 80 between the heating element support 20 and the coil 23. In the example shown in FIG. 15, the heating element support 20 has a cross-sectional shape being a 4-arm cross, where the arms are spaced evenly apart. The coil 23 is wound around the heating element support 20 and gaps 80 are provided between adjacent arm sections and the coil 23.

Figure 16:
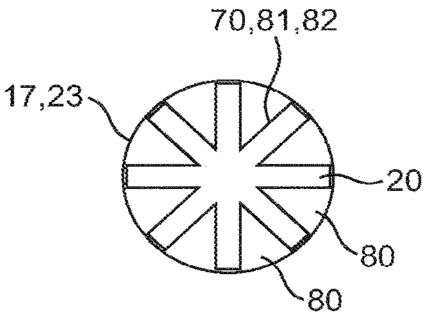
FIG. 16 is an end view of a coil and a heating element support having an 8 arm cross, cross-section.

In the example shown in FIG. 16, the heating element support 20 has a cross-sectional shape being an 8-arm cross, where the arms are spaced evenly apart. The coil 23 is wound around the heating element support 20 and gaps 80 are provided between adjacent arm sections and the coil 23.

Figure 17:
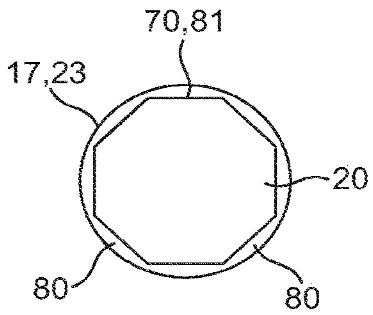
FIG. 17 is an end view of a coil and a heating element support having an octagonal cross-section.
Figure 18:
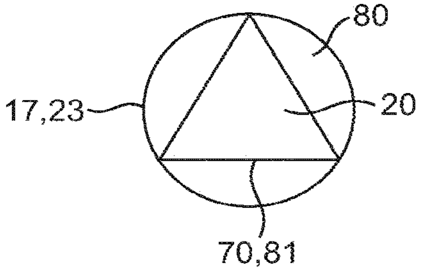
FIG. 18 is an end view of a coil and a heating element support having a triangular cross-section.
Figure 19:
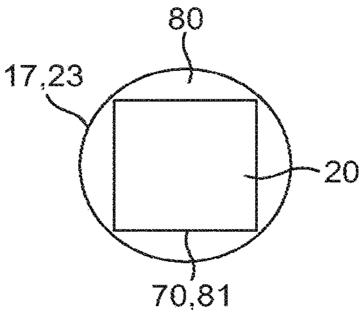
FIG. 19 is an end view of a coil and a heating element support having a square cross-section.
Figure 20:
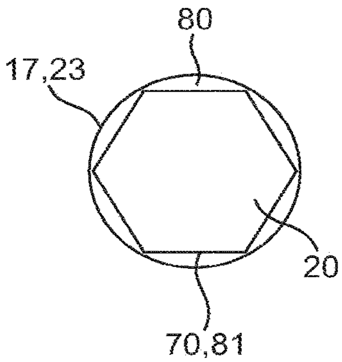
FIG. 20 is an end view of a coil and a heating element support having a hexagonal cross-section.
Figure 21:
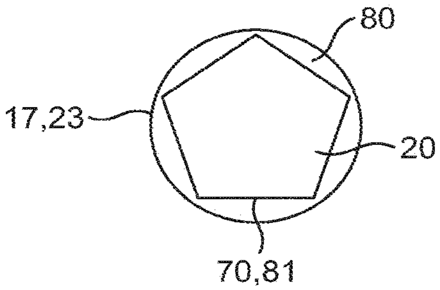
FIG. 21 is an end view of a coil and a heating element support having a pentagonal cross-section.
Figure 22:
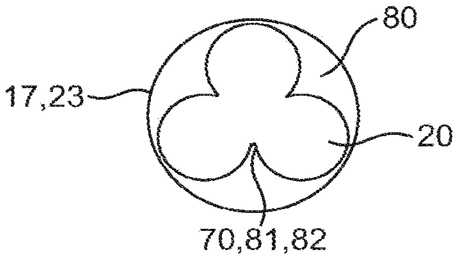
FIG. 22 is an end view of a coil and a heating element support having cross-sectional shape of three circles joined together.

FIGS. 17 to 21 show examples where the heating element support 20 has a cross-sectional shape being a regular polygon. Each of these has a different number of sides, FIG. 17 is an octagon, FIG. 18 is a triangle, FIG. 19 is a square, FIG. 20 is a hexagon and FIG. 21 is a pentagon. The coil 23 is wound around the heating element support 20 and is in contact with the heating element support 20 at the edges of the support 20 corresponding to the corners of the cross-sectional shapes. In this way, polygons with more sides have more contact with the coil 23 and provide a greater number of smaller gaps 80 between the coil 23 and the heating element support 20. This enables a cross-sectional shape to be selected that gives an optimum amount of contact between the heating element support 20 and the coil 23, and optimum gap 80 formation. In the example shown in FIG. 22, the heating element support 20 has a cross-sectional shape corresponding to three overlapping circles joined together. The coil 23 is wound around the heating element support 20 and gaps 80 are provided between adjacent circle sections and the coil 23.

The distance between the wire and the surface 28 at each gap 80 is described above as being in the range of 10 micrometers to 500 micrometers. However, other gap 80 sizes are possible.

The wire of the coil 23 is described above as being approximately 0.12 mm thick. However, other wire diameters are possible. For example, the diameter of the coil 23 wire may be in the range of 0.05 mm to 0.2 mm. Moreover, the coil 23 length may be different to that described above. For example, the coil 23 length may be in the range of 20 mm to 40 mm. The internal diameter of the coil 23 may be different to that described above. For example, the internal diameter of the coil 23 may be in the range of 0.5 mm to 2 mm.

The pitch of the helical coil 23 may be different to that described above. For example, the pitch may be between 120 micrometers and 600 micrometers.

Furthermore, although the distance of the voids between turns of the coil is described above as being approximately 300, different void distances are possible. For example, the void may be between 20 micrometers and 500 micrometers.

The size of the gaps 80 may be different to that described above.

Where channels 82 are provided in the heating element support 20, a number other than one or four can be used.

Channels 82 have been described as longitudinal grooves along the surface 28 of cylindrical supports 20. However, the channels 82 may, for example, alternatively or additionally comprise helical grooves in the surface 28 of a cylindrical support 20, spiralling about the axis of the support. Alternatively or additionally the channels 82 may comprise circumferential rings around the surface 28 of the support 20.

In embodiments, the support 20 is described as being slightly longer than the coil 23, such that it protrudes from either end of the coil 23. Alternatively, the support 20 may be shorter in length than the coil 23 and may therefore reside entirely within the bounds of the coil.

The heating element 17 is not restricted to being a coil 23, and may be another wire form such as a zig-zag shape.

Heating rods 29 are described above comprising an elongated heating element support 20 with a coil 23 wound around it and a gap 80 or gaps 80 provided between the coil 23 and the heating element support 20 by virtue of the cross-sectional shape of the support 20 comprising a polygon. In this case, the cross-sectional shape of the heating element support 20 may for example be a 3 sided, 4 sided, 5 sided, 6 sided or an 8 sided polygon.

The heating element support 20 may be cylinder-like but non-cylindrical.

Figure 23:
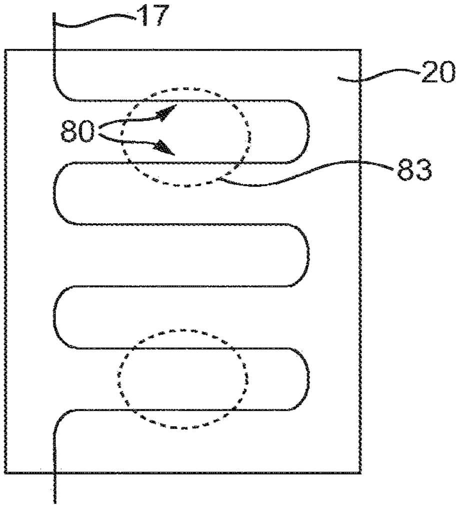
FIG. 23 is a front view of a heating element support substrate and heating element.
Figure 24:
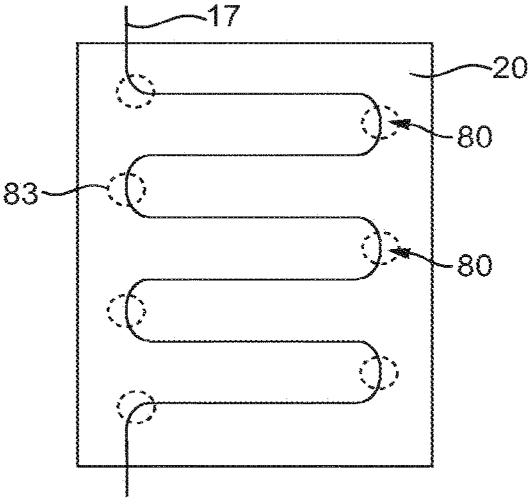
FIG. 24 is a front view of a heating element support substrate and with a threaded heating element.

FIGS. 23 and 24 show examples of a further type of heating element support 20. Again, in each case the shape of support 20 provides natural gaps 80 between the support 20 and a heating element 17. These gaps 80 facilitate increased wicking, liquid storage and vaporization.

In FIG. 23, a heating element support 20 and heating element 17 is shown. The heating element support 20 is a substantially flat substrate and the heating element 17 is arranged on the surface of the substrate in a zig-zag configuration to maximize the length of the heating element 17 for a given surface area of substrate. The heating element support 20 has substrate apertures 83, and gaps 80 are formed between the heating element support 20 and the heating element 17 when the heating element 17 overlaps the substrate apertures 83.

FIG. 24 shows an example similar to that shown in FIG. 23. A heating element support 20 is a flat substrate comprising substrate apertures 83 and a zig-zag heating element 17. In this example, the substrate apertures 83 are located at the turning points of the zig-zag heating element 17 and the heating element 17 wire is threaded in and out of the substrate apertures 83 on respective turns such that the heating element 17 lies of both surfaces of the flat substrate. Gaps 80 are provided between the heating element 17 and the substrate at the substrate aperture 83 locations.

In embodiments, the heating element support 20 could be made from a porous material such as porous ceramic to allow liquid storage within the support 20.

An electronic vapour provision device comprising an electronic cigarette 1 is described herein. However, other types of electronic vapour provision device are possible.

The electronic cigarette 1 is not restricted to the sequence of components described and other sequences could be used such as the control circuit 11, 56 being in the tip of the device or the liquid store 7, 51 being in the electronic cigarette 1 body 3 rather than the mouthpiece 2. The vaporizer 6, 52 may form part of the electronic cigarette 1 body 3.

Where the heating element support 20 is a substrate, the heating element 17 could be wrapped around the substrate. Furthermore, the heating element 17 may be threaded in and out of the heating element support 20.

An air pressure sensor 13, 58 is described herein. In embodiments, an airflow sensor may alternatively or additionally be used to detect that a user is sucking on the device 1.

Reference herein to a vaporization cavity 19, 66 may be replaced by reference to a vaporization region.

The electronic cigarette 1 of FIG. 2 is described as comprising three detachable parts, the mouthpiece 2, the vaporizer 6 and the battery assembly 5. Alternatively, the electronic cigarette 1 may be configured such these parts 2, 6, 5 are combined into a single integrated unit. In other words, the mouthpiece 2, the vaporizer 6 and the battery assembly 5 may not be detachable. As a further alternative, the mouthpiece 2 and the vaporizer 6 may comprise a single integrated unit, or the vaporizer 6 and the battery assembly 5 may comprise a single integrated unit.

The electronic cigarette 1 of FIG. 3 is described as comprising two detachable parts, the mouthpiece 2 and the body comprising the battery assembly 50. Alternatively, the electronic cigarette 1 may be configured such these parts 2, 50 are combined into a single integrated unit. In other words, the mouthpiece 2 and the body 3 may not be detachable.

Although examples have been shown and described it will be appreciated by those skilled in the art that various changes and modifications might be made without departing from the scope of the invention.

In order to address various issues and advance the art, the entirety of this disclosure shows by way of illustration various embodiments in which the claimed invention(s) may be practiced and provide for superior electronic vapour provision. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future. Any feature of any embodiment can be used independently of, or in combination with, any other feature.

The invention claimed is:

1. An electronic vapor provision device comprising:

at least one casing;

an air passageway extending from an air inlet to an air outlet;

a heating element having an axis from a first end to a second end along a longest dimension of the heating element, the axis of the heating element being oriented perpendicular to a longitudinal axis of the electronic vapor provision device;

a heating element support configured to support the heating element, wherein the heating element support is elongated, is one or both of rigid and solid, and is situated along the axis of the heating element;

at least one gap defined between the heating element support and the heating element;

a liquid store defined within a hollow portion of the at least one casing;

a wicking element that is configured to wick a liquid from the liquid store to the heating element and that comprises a porous material extending outwardly from the first end and the second end of the heating element; and a vaporization cavity, wherein the heating element and the wicking element are at least partially arranged within the vaporization cavity.

2. The electronic vapor provision device of claim 1, wherein the heating element comprises a plurality of successive turns.

3. The electronic vapor provision device of claim 1, wherein the heating element defines a zig-zag configuration.

4. The electronic vapor provision device of claim 1, wherein the heating element comprises a heating coil coiled around the heating element support.

5. The electronic vapor provision device of claim 1, wherein the heating element is disposed on an outside surface of the heating element support.

6. The electronic vapor provision device of claim 1, wherein the air inlet is defined at a first end of the at least one casing.

7. The electronic vapor provision device of claim 6, wherein the electronic vapor provision device further comprises electrical contacts arranged at the first end of the at least one casing.

8. The electronic vapor provision device of claim 1, wherein the heating element support has a length that is greater than the longest dimension of the heating element.

9. The electronic vapor provision device of claim 1, wherein the liquid is wicked and stored in the at least one gap.

10. The electronic vapor provision device of claim 1, further comprising a power cell arranged so that electrical power is deliverable to the heating element from the power cell.

11. The electronic vapor provision device of claim 10, wherein the power cell is arranged within a battery assembly casing that is configured in connection with the at least one casing.

12. The electronic vapor provision device of claim 1, further comprising a control circuit including an air pressure sensor and a controller.

13. An electronic vapor provision device comprising:

at least one casing:

an air passageway extending from an air inlet that is defined at a first end of the at least one casing to an air outlet, at least a portion of the air passageway being substantially parallel to a longitudinal axis of the electronic vapor provision device;

a heating element having an axis along a longest dimension of the heating element, the axis of the heating element being oriented perpendicular to the longitudinal axis of the electronic vapor provision device;

a heating element support configured to support the heating element, wherein the heating element support is elongated, is one or both of rigid and solid, and is situated along the axis of the heating element;

at least one gap defined between the heating element support and the heating element; and a wicking element configured to wick a liquid to the heating element.

14. The electronic vapor provision device of claim 13, wherein the heating element comprises a plurality of successive turns.

15. The electronic vapor provision device of claim 13, wherein the heating element defines a zig-zag configuration.

16. The electronic vapor provision device of claim 13, wherein the heating element comprises a heating coil coiled around the heating element support.

17. The electronic vapor provision device of claim 13, wherein the heating element is disposed on an outside surface of the heating element support.

18. The electronic vapor provision device of claim 13, wherein the electronic vapor provision device further comprises electrical contacts arranged at the first end of the at least one casing.

19. The electronic vapor provision device of claim 13, further comprising a liquid store.

20. The electronic vapor provision device of claim 19, wherein one or both of the following conditions applies:

the wicking element is configured to wick liquid in a direction from the liquid store to the heating element;

the liquid store is defined within a hollow portion of the at least one casing.

21. The electronic vapor provision device of claim 13, wherein one or both of the following conditions applies:

the wicking element comprises a porous material extending outwardly from a first end and a second end of the heating element;

the heating element support has a length that is greater than the longest dimension of the heating element.

22. The electronic vapor provision device of claim 13, further comprising a vaporization cavity.

23. The electronic vapor provision device of claim 22, wherein the heating element and the wicking element are at least partially arranged within the vaporization cavity.

24. The electronic vapor provision device of claim 13, wherein the liquid is wicked and stored in the at least one gap.

25. The electronic vapor provision device of claim 13, further comprising a power cell arranged so that electrical power is deliverable to the heating element from the power cell.

26. The electronic vapor provision device of claim 25, wherein the power cell is arranged within a battery assembly casing that is configured to connect with the at least one casing.

27. The electronic vapor provision device of claim 13, further comprising a control circuit including an air pressure sensor and a controller.

28. An electronic vapor provision device comprising:

at least one casing;

an air passageway extending from an air inlet to an air outlet;

a heating element having an axis from a first end to a second end along a longest dimension of the heating element, the axis of the heating element being oriented perpendicular to a longitudinal axis of the electronic vapor provision device, and the heating element defining a zig-zag configuration;

a heating element support configured to support the heating element, wherein the heating element support is elongated, is one or both of rigid and solid, and is situated along the axis of the heating element;

at least one gap defined between the heating element support and the heating element;

a liquid store defined within a hollow portion of the at least one casing; and a wicking element that is configured to wick a liquid from the liquid store to the heating element and that comprises a porous material extending outwardly from the first end and the second end of the heating element.

29. An electronic vapor provision device comprising:

at least one casing:

an air passageway extending from an air inlet to an air outlet, at least a portion of the air passageway being substantially parallel to a longitudinal axis of the electronic vapor provision device;

a heating element having an axis along a longest dimension of the heating element, the axis of the heating element being oriented perpendicular to the longitudinal axis of the electronic vapor provision device, and the heating element defining a zig-zag configuration;

a heating element support configured to support the heating element, wherein the heating element support is elongated, is one or both of rigid and solid, and is situated along the axis of the heating element;

at least one gap defined between the heating element support and the heating element; and a wicking element configured to wick a liquid to the heating element.

* * * * *